United States Patent
Peyravian et al.

(10) Patent No.: US 7,694,136 B2
(45) Date of Patent: *Apr. 6, 2010

(54) METHOD FOR DISTRIBUTING AND AUTHENTICATING PUBLIC KEYS USING HASHED PASSWORD PROTECTION

(75) Inventors: Mohammad Peyravian, Morrisville, NC (US); Allen Leonid Roginsky, Durham, NC (US); Nevenko Zunic, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 1993 days.

This patent is subject to a terminal disclaimer.

(21) Appl. No.: 10/361,250

(22) Filed: Feb. 10, 2003

(65) Prior Publication Data

US 2004/0158714 A1    Aug. 12, 2004

(51) Int. Cl.
*H04L 9/32*    (2006.01)
*H04L 29/06*   (2006.01)
(52) U.S. Cl. .................... 713/168; 713/156
(58) Field of Classification Search .......... 713/171, 713/182, 156, 198, 168
See application file for complete search history.

(56) References Cited

U.S. PATENT DOCUMENTS

| | | | |
|---|---|---|---|
| 4,799,258 A | 1/1989 | Davies | 380/21 |
| 5,920,630 A * | 7/1999 | Wertheimer et al. | 380/286 |
| 5,995,625 A * | 11/1999 | Sudia et al. | 705/51 |
| 6,091,819 A | 7/2000 | Venkatesan et al. | 380/28 |
| 6,154,543 A | 11/2000 | Baltzley | 380/255 |
| 6,226,383 B1 | 5/2001 | Jablon | 380/30 |
| 6,230,269 B1 * | 5/2001 | Spies et al. | 713/182 |
| 6,292,895 B1 | 9/2001 | Baltzley | 713/168 |
| 6,317,829 B1 | 11/2001 | Van Oorschot | 713/155 |
| 6,370,250 B1 | 4/2002 | Stein | 380/281 |
| 6,389,136 B1 | 5/2002 | Young et al. | 380/28 |
| 7,007,164 B1 * | 2/2006 | Euchner et al. | 713/168 |
| 2002/0062248 A1 * | 5/2002 | Sakurai | 705/14 |
| 2002/0073311 A1 * | 6/2002 | Futamura et al. | 713/157 |
| 2003/0191936 A1 * | 10/2003 | Kawatsura et al. | 713/156 |
| 2003/0226017 A1 * | 12/2003 | Palekar et al. | 713/168 |

OTHER PUBLICATIONS

Schneier, Bruce. Applied Cryptography, 2nd Edition. John Wiley & Sons, Inc. New York. 1997. pp. 237-239.*

* cited by examiner

*Primary Examiner*—Kambiz Zand
*Assistant Examiner*—Jason K Gee
(74) *Attorney, Agent, or Firm*—Schmeiser, Olsen & Watts; Anna Linne

(57) ABSTRACT

A method to distribute and authenticate public encryption keys. A client concatenates its ID, its public key, and a secret password known to the client and a server, and hashes the result. The client forms an extended concatenation including the ID, the public key, and the hashed value, and sends the extended concatenation to the server. The server reads the ID and public key, and re-computes the hashed value based on its own knowledge of the password. If the received and the computed hashed values are the same, the server concludes that the client's public key is authentic. An analogous process enables the server to distribute its public key, and enables the client to authenticate the server's distributed public key.

6 Claims, 4 Drawing Sheets

METHOD FOR DISTRIBUTING AND AUTHENTICATING PUBLIC KEYS USING HASHED PASSWORD PROTECTION

CROSS REFERENCE TO RELATED APPLICATIONS

Reference is made to the inventors' commonly assigned U.S. patent applications "Method for Distributing and Authenticating Public Keys Using Time Ordered Exchanges," and "Method for Distributing and Authenticating Public Keys Using Random Numbers and Diffie-Hellman Public Keys," which were filed on the same day as the present application.

FIELD OF THE INVENTION

The invention relates to the field of data security, and more specifically to the field of distributing and authenticating public cryptographic keys.

BACKGROUND

Cryptography is the science of securing data. Various mechanisms have been proposed to accomplish this purpose and to defend against attacks on the security and privacy of electronic transmissions over communication channels. The most commonly used algorithms encrypt data according to a key that is known only to the sender and receiver of the transmission. These are called symmetric key algorithms, in that both the sender and the receiver share the same key, which must be kept secret. Several symmetric key algorithms are well known, perhaps the most notable among them being the Data Encryption Standard (DES) algorithm sponsored by the National Institute of Standards and Technology, and described by Schneier in *Applied Cryptography*, John Wiley and Sons (second edition, 1996). Because a symmetric algorithm's encryption key must be kept secret, the key is often distributed using public key cryptography. key cryptography was first proposed by Diffie and Hellman ("New Directions in Cryptography," IEEE Trans. Information Theory, vol. IT-22, no. 6, pp. 644-654, November 1976). Other public key algorithms are well known, including, for example, the RSA algorithm, as described by Rivest, Shamir, and Adelman ("A Method for Obtaining Digital Signatures and Public Key Cryptosystems," Comm. of the ACM, vol. 21. no. 2, pp. 120-126, February 1978) and the elliptic curve cryptosystem, as described by Koblitz ("Elliptic Curve Cryptosystems," Mathematics of Computation, vol. 48, no. 177, pp. 203-209, 1987) and by Miller ("Use of Elliptic Curves in Cryptography," Advances in Cryptology—Crypto '85 Proceedings, Springer-Verlag, pp. 417-426, 1986).

In public key cryptography, which employs an asymmetric algorithm, each user has a public key, which may be published and widely known, and a private key, which must be kept secret. The efficacy of public key cryptography follows from the difficulty of deriving a private key from its associated public key.

As mentioned above, an important application of public key cryptography is the distribution of symmetric encryption keys. Symmetric encryption keys that are distributed with the help of public key cryptography can be trusted to be secure and valid if all the protections are implemented and executed properly. Nevertheless, a question arises as to whether the public keys themselves can be trusted. For example, a party that publishes a public key may not in fact have possession of a corresponding private key, or the published public key may be corrupted or invalid. Encrypting sensitive data such as a symmetric encryption key using a somehow-bogus public key may result in a loss of privacy and diminished security.

Consequently, it has become important to authenticate public keys before using them, in order to ensure that public keys belong to legitimate parties. Authorities that can be trusted to do this have been set up. These authorities verify that public keys are correct and that they in fact belong to the parties claiming their ownership. Such an authority is often called a Certification Authority (CA). A CA validates a public key by issuing a certificate, which the CA signs using its own private key. A recipient of a signed certificate may then authenticate the certificate using the CAs public key to verify the signature.

This CA-based solution is often called a Public Key Infrastructure (PKI). A PKI includes the CAs, parent CAs capable of authenticating other CAs, and finally a root CA, which ultimately must be trusted, to authenticate the parent CAs. The various CAs and other parties that are part of the PKI act together according to agreed protocols and procedures. For example, ITU-T Recommendation X.509 (Information Technology—Open Systems Interconnection—The Directory: Authentication Framework, June 1997) is a widely accepted PKI standard that defines data formats and procedures pertaining to the distribution of public keys via public key certificates that are digitally signed by CAs.

Unfortunately, despite its many benefits, an X.509 PKI requires a massive and expensive infrastructure with complex operations. Thus there is a need for an alternative to the X.509 PKI that provides the same benefits but demands less in the way of bandwidth, storage, and complexity.

SUMMARY

The present invention provides an improved way to distribute and authenticate public cryptographic keys. According to the invention, a client concatenates its ID, its public cryptographic key, and a secret password known by the client and a server, and hashes the concatenation. The client then forms an extended concatenation comprising the ID, the client's public key, and the hashed value. The resulting extended concatenation is sent to the server. The server receives the extended concatenation from the client, and reads the ID and the client's public key. The server then re-computes the hashed value based on the server's own knowledge of the password. If the received and the re-computed versions of hashed value are the same, the server concludes that the client's public key is authentic. An analogous process enables distribution of the server's public cryptographic key and enables the client to authenticate the server's public key.

DETAILED DESCRIPTION

The invention is described below in the context of a server and a client, although the invention is not limited to this context. In the description that follows, the client is a user's machine, and the server is a service provider's. A secret password, which may be distributed over a secure channel, is assumed to be known by both the client and the server. The password is assumed to be sufficiently long so that a random guess by either an unauthorized user or a rogue service provider is highly unlikely to be correct. Such assumptions are made today with great evident success in the context of banking. For example, a banking user may receive his or her ATM-card and its associated password separately through the mail; the password is required to have at least a specified minimum number of characters. Perhaps more apropos to the present invention, however, banks, brokers, and others rely on these same general principles to provide secure transmission of identifiers and passwords to clients using Secure Socket Layer (SSL) applications.

In the description that follows, the following notation is used:

ID—client's user identifier, which need not be kept secret;
PW—secret one-time-use password that is known by both the client and the server;
PKc—initial public key component of the client's public/private key pair;
SKc—initial private key component of the client's public/private key pair;
PKs—initial public key component of the server's public/private key pair;
SKs—initial private key component of the server's public/private key pair;
eA(B)—data B encrypted with a symmetric key A using an agreed-upon symmetric encryption algorithm;
ePK(B)—data B encrypted with an asymmetric public key PK, using an agreed-upon asymmetric encryption algorithm; and
eSK(B)—data B encrypted with an asymmetric private key SK, using an agreed-upon asymmetric encryption algorithm.

Figure 1:
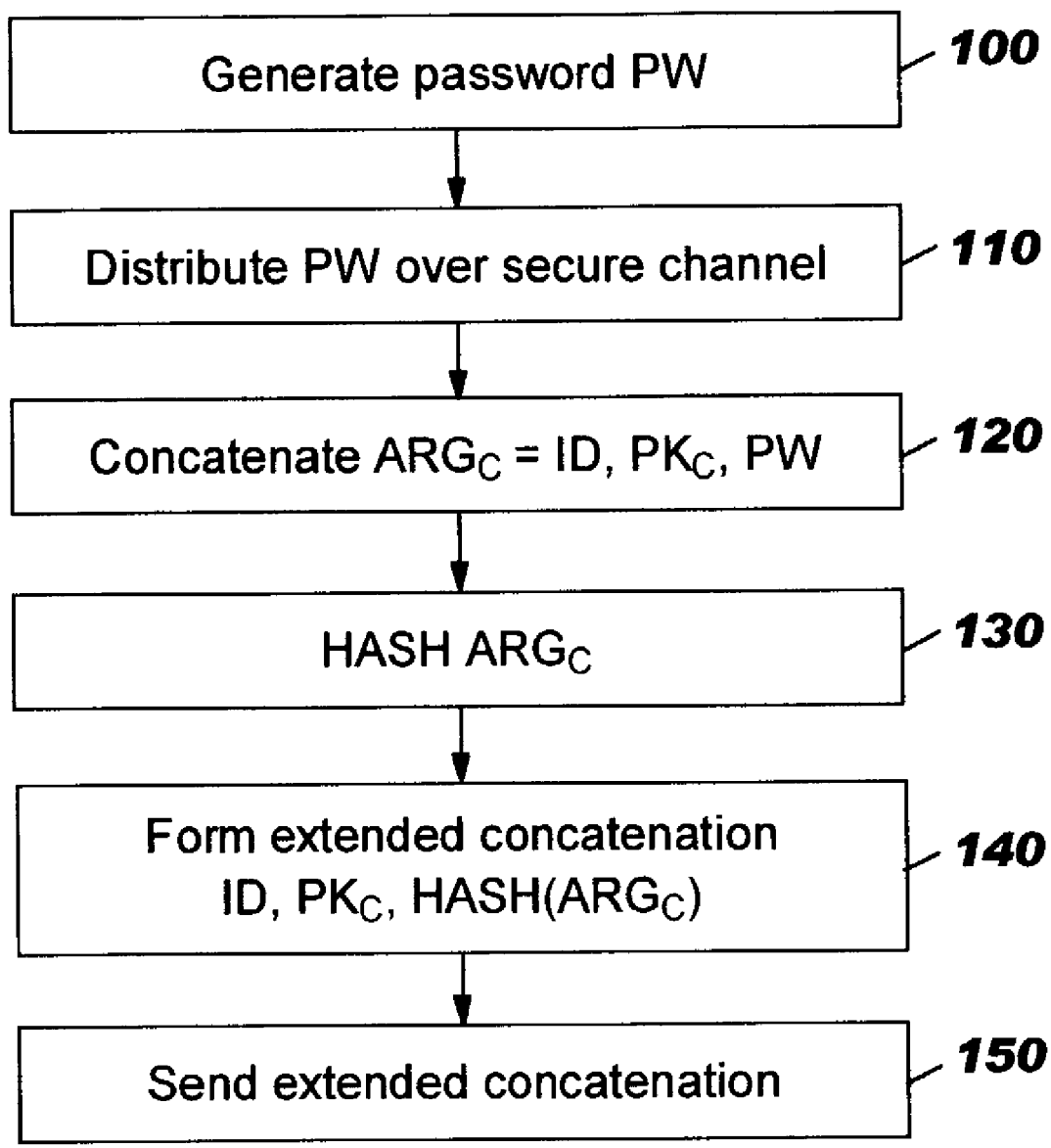
FIG. 1 shows steps of the method according to the present invention for distributing a client's public key.

FIG. 1 shows steps of the method according to the present invention for distributing a client's public cryptographic key. As shown in FIG. 1, a random password PW is generated using current practices (step 100), and distributed securely to the client and to a server over a secure channel (step 110). For example, the server may generate and send the pair (ID, PW) to the client using conventional mail, email, or telephone. Although the term password is used here, a pass phrase may be used instead, the difference between the two being only a matter of semantics regarding the number of characters involved.

The client concatenates the client ID, the public key of the client, and the password, to provide an argument ARGc, where ARGc=ID,PKc,PW (step 120), and hashes the argument ARGc to provide a hashed value Hash(ARGc) (step 130). The hash function may be any collision-resistant hash function drawn from the art of cryptography. A preferred embodiment of the invention uses the Secure Hash Algorithm SHA-1, which is described by Schneier (op cit). Although the order of the concatenation that provides the argument ARGc is shown here for descriptive convenience as ID,PKc,PW, other permutations of the constituents of the argument ARGc may also be used. For example, the concatenation PW,PKc,ID may be used as the argument ARGc of the hash function instead of ID,PKc,PW. The client then forms an extended concatenation ID,PKc,Hash(ARGc) (step 140), and sends the extended concatenation to the server (step 150). Again, the order of the constituents of the extended concatenation is not important.

Figure 2:
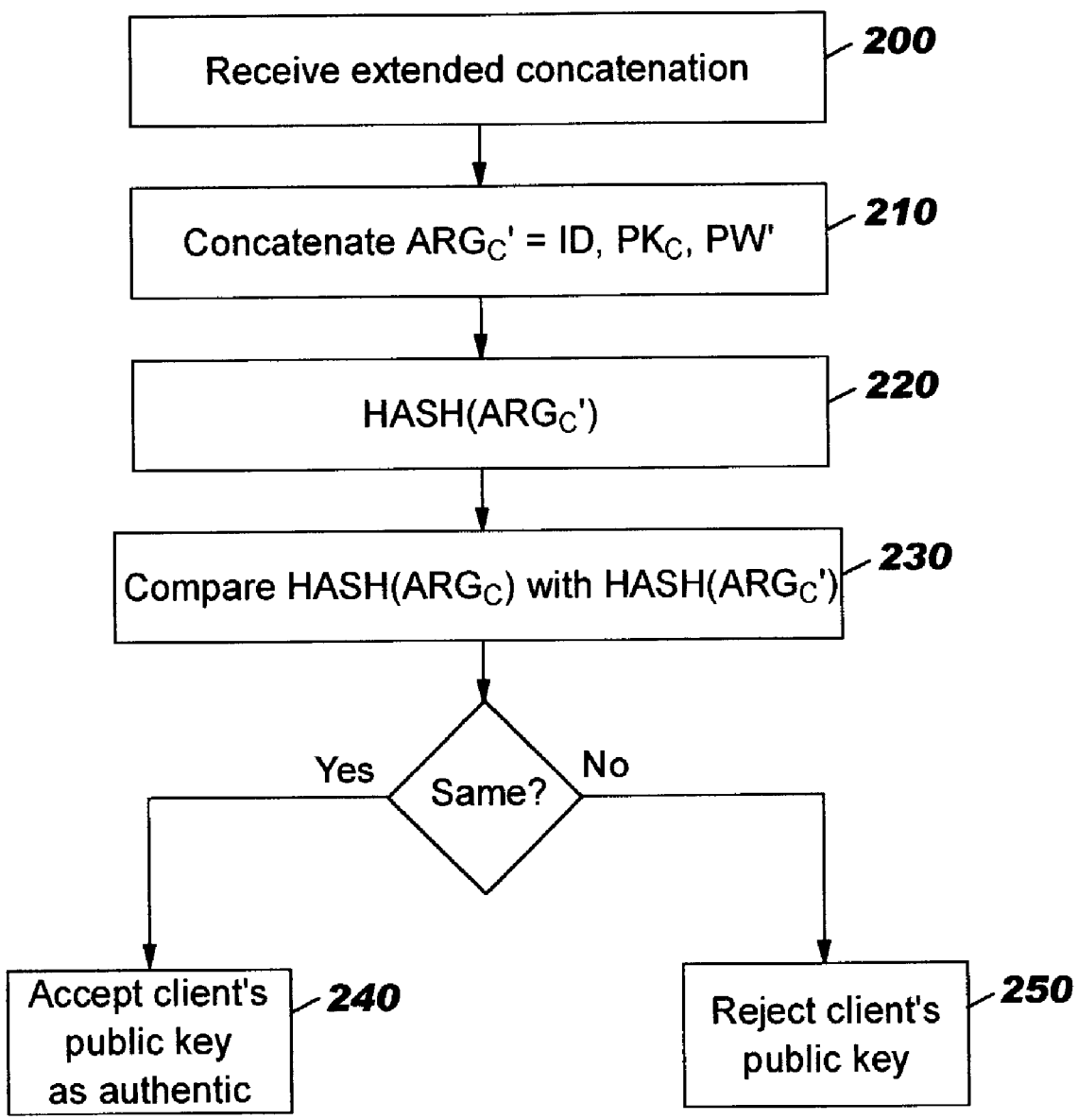
FIG. 2 shows steps of the method according to the present invention executed by a server to authenticate a public key received from the client.

FIG. 2 shows steps of the method according to the present invention executed by the server to authenticate the public key received from the client. The server receives the extended concatenation (step 200). Upon receiving the extended concatenation from the client, the server performs the same steps performed by the client to compute the hashed value, here using the server's own knowledge of the password PW', and compares its own computed results of the hashed value with the received results. If the two agree, the server has determined that the client knows the password and has used it properly, and therefore presumes that the received public key is authentic.

More specifically, the server concatenates the ID received from the client, the public key PKc received from the client, and the password PW' already known by the server, to provide an argument ARGc', where ARGc'=ID,PKc,PW' (step 210), and hashes the argument ARGc' to provide the hashed value Hash(ARGc') (step 220). The server then compares the computed Hash(ARGc') with the received Hash(ARGc) (step 230). If the two are the same, the server concludes that client knows the password and has used it properly, and therefore accepts the client's public key as authentic (step 240). Otherwise, i.e., the two versions of the hashed value are not the same, the server rejects the client's public key (step 250).

Figure 3:
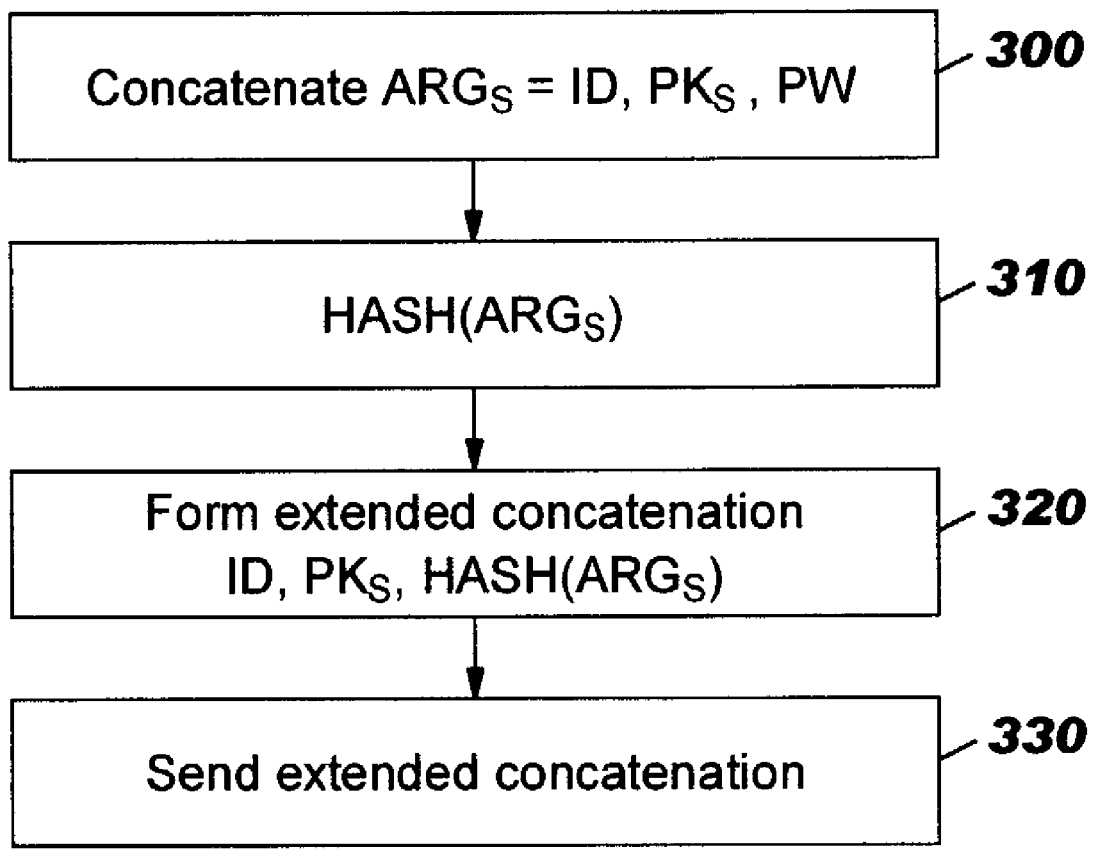
FIG. 3 shows steps of the method according to the present invention for distributing a server's public key.

FIG. 3 shows steps of the method according to the present invention for distributing the server's public cryptographic key after the password PW has been generated and distributed as described above. As shown in FIG. 3, the server concatenates the client ID, the public key PKs of the server, and the password PW, to provide an argument ARGs, where ARGs=ID,PKs,PW (step 300), and hashes the argument ARGs to provide the hashed value Hash(ARGs) (step 310). Although the order of the concatenation that provides the argument ARGs is shown here for descriptive convenience as ID,PKs,PW, other permutations of the constituents of the argument ARGs may be used. The server then forms an extended concatenation ID,PKs,Hash(ARGs) (step 320), and sends the extended concatenation to the client (step 330). Again, the order of the constituents of the extended concatenation is not important.

Figure 4:
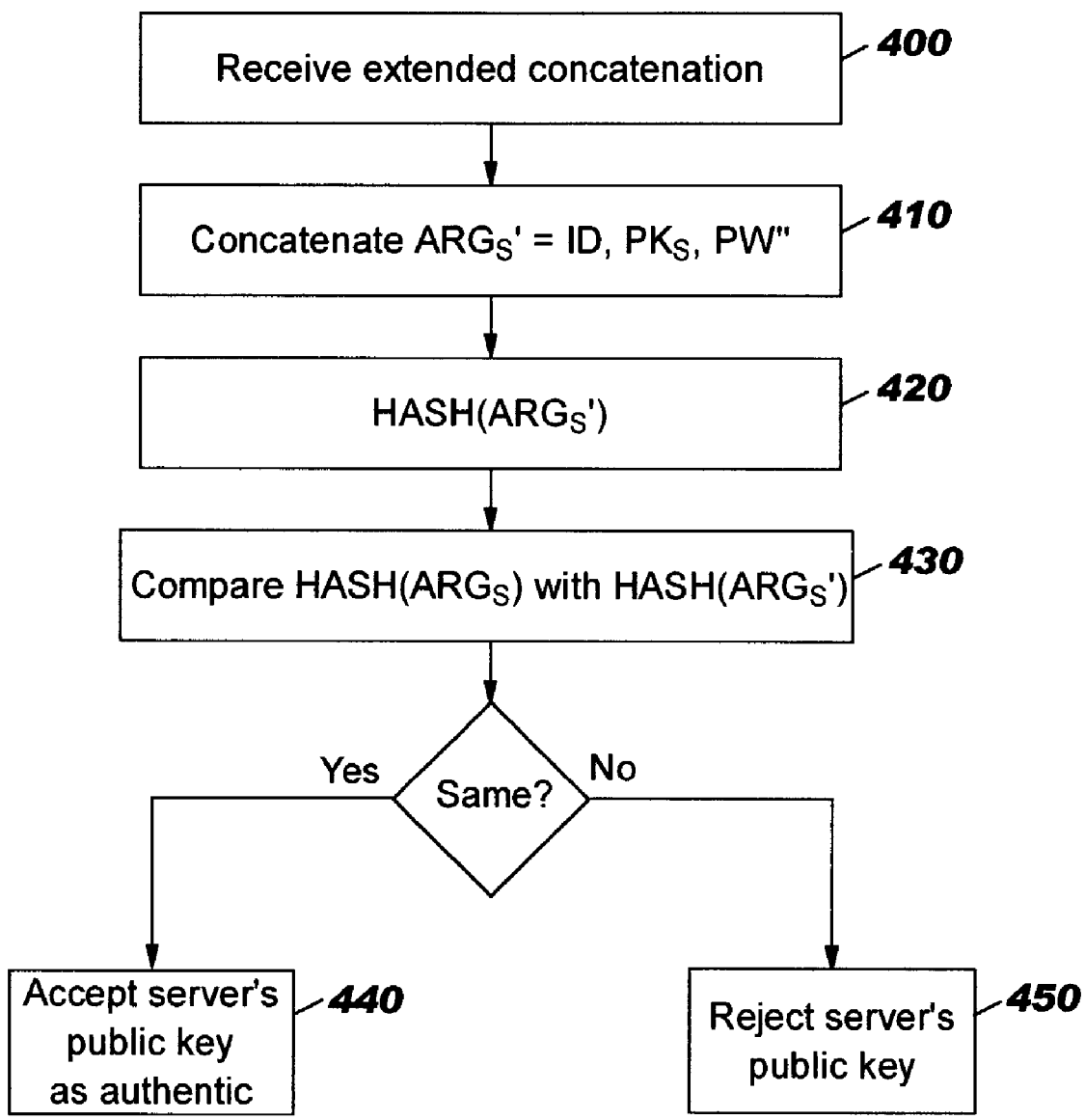
FIG. 4 shows steps of the method according to the present invention executed by the client to authenticate a public key received from the server.

FIG. 4 shows steps of the method according to the present invention executed by the client to authenticate the public key received from the server. The client receives the extended concatenation (step 400). Upon receiving the extended concatenation from the server, the client performs the same steps performed by the server to compute the hashed value, here using the client's own knowledge of the password PW", and compares its own computed results of the hashed value with the received results. If the two agree, the client has determined that the server knows the password and has used it properly, and therefore presumes that the received public key is authentic.

More specifically, the client concatenates the ID received from the server, the public key PKs received from the server, and the password PW" already known by the client, to provide an argument ARGs', where ARGs'=ID,PKs,PW" (step 410), and hashes the argument ARGs' to provide the hashed value Hash(ARGs') (step 420). The client compares the computed Hash(ARGs') with the received Hash(ARGs) (step 430). If the two are the same, the client concludes that server knows the password and has used it properly, and therefore accepts the server's public key as authentic (step 440). Otherwise, i.e., the two versions of the hashed value are not the same, the client rejects the server's public key (step 450).

Thus the server has authenticated the client, and the client has authenticated the server. Now the client and the server can use public key cryptography further, with confidence that the public keys are authentic. The client and the server may discard the password PW, as it is not used again. Neither the client nor the server accept any further messages supposedly protected according to PW. Moreover, at this point there is no longer any need to keep PW secret, as PW has been used only for authentication rather than for encryption of sensitive data.

It is important to note that the flows described above can be added to the top of current Secure Socket Layer (SSL) architectures to provide public key distribution without affecting the underlying applications. Since most SSL applications require password-based authentication of the client, the client can then generate a password PWc and send it to the server as the concatenation ID,ePKs(PWc),eSKc(Hash(ID,PWc)). This allows current SSL application to continue using their current password-based authentications as well, since the additions will be transparent to the existing application.

The method described above may be used to recover when either the client or the server has knowledge that its private key SKc or SKs, respectively, is compromised. If SKc is compromised, the client sends an "SKc compromised" message to the server in the concatenation ID,"SKc compromised",eSKc(Hash(ID,"SKc compromised")). The client and server suspend the exchange of data while the client determines a new public key and private key. The client then sends its new public key to the server as described above. If SKs is compromised, the server sends an "SKs compromised" message to the client in the concatenation ID,"SKs compromised",eSKs(Hash(ID,"SKs compromised")). The client and server suspend the exchange of data while the server determines a new public key and private key. The server then sends its new public key to the client as described above.

Keys that are not compromised may also be changed from time to time using the inventive method of the present invention. To do so, the client generates a new public key, private key pair, and sends the new public key new_PKc to the server in the concatenation ID,new_PKc,eSKc(Hash(ID,new_PKc)). The client and server both use the client's new public key, and reject any data encrypted according to the old public key. Likewise, a new public key new_PKs for the server may be distributed to the client in the concatenation ID,new_PKs, eSKs(Hash(ID,new PKs)).

From the foregoing description, those skilled in the art will now appreciate that the present invention provides an economical alternative to an X.509 PKI for distributing and authenticating public cryptographic keys. The foregoing description is illustrative rather than limiting, however, and the invention is limited only by the claims that follow.

We claim:

1. A method for distributing a public cryptographic key to a recipient, comprising the steps of:
   a sender receiving from the recipient parameters consisting of an identifier of the sender and a secret password in response to the recipient having generated the secret password;
   said sender hashing an argument that consists of the received identifier, a public cryptographic key of a public/private key pair of the sender, and the secret password to provide a hashed value, wherein said hashing is performed by a processor at the sender; and
   said sender sending the identifier of the sender, the public cryptographic key, and the hashed value to the recipient.

2. The method of claim 1, wherein the sender is a server, and wherein the recipient is a client.

3. The method of claim 1, wherein the sender is a client, and wherein the recipient is a server.

4. A method for authenticating a public cryptographic key sent to a recipient by a sender, comprising the steps of:
   receiving, by a recipient from a sender, an identifier (ID) of the sender, a public cryptographic key of a public/private key pair of the sender, and a hashed value of a first argument that includes the ID of the sender, the public cryptographic key, and a secret password known by the sender and the recipient;
   hashing, by the recipient, a second argument that consists of the received ID of the sender, the received public cryptographic key, and the secret password, to provide a hashed value of the second argument, wherein said hashing is performed by a processor at the recipient;
   comparing the hashed value of the first argument with the hashed value of the second argument; and
   comparing the hashed value of the first argument with the hashed value of the second argument;
   ascertaining that the hashed value of the first argument is the same as the hashed value of the second argument; and
   responsive to said ascertaining, accepting the public cryptographic key as authentic.

5. The method of claim 4, wherein the first argument consists of the ID of the sender, the public cryptographic key, and the secret password.

6. A method for distributing a public cryptographic key by a sender and authenticating the distributed public cryptographic key by a recipient, comprising the steps of:
   by a sender, concatenating an identifier, a public cryptographic key, and a secret password known by the sender and the recipient, to provide a first argument; hashing the first argument to provide a first hashed value; concatenating the identifier, the public cryptographic key, and the first hashed value, to provide an extended concatenation; and sending the extended concatenation to a recipient, wherein said hashing the first argument is performed by a processor at the sender; and
   by the recipient, receiving the extended concatenation, concatenating the identifier of the extended concatenation, the public cryptographic key of the extended concatenation, and the password, to provide a second argument; hashing the second argument to provide a second hashed value; comparing the first hashed value and the second hashed value; and, if the first hashed value and the second hashed value are the same, concluding that the public cryptographic key of the extended concatenation is authentic, wherein said hashing the second argument is performed by a processor at the recipient,
   wherein the first argument consists of the identifier, the public cryptographic key, and the password;
   wherein the extended concatenation consists of the identifier, the public cryptographic key, and the first hashed value; and
   wherein the second argument consists of the identifier of the extended concatenation, the public cryptographic key of the extended concatenation, and the password.

* * * * *